(12) United States Patent
Chancy

(10) Patent No.: US 8,814,428 B2
(45) Date of Patent: Aug. 26, 2014

(54) TEMPERATURE SENSING APPARATUS

(75) Inventor: Jean-Marie Chancy, Roissy en Brie (FR)

(73) Assignee: Renishaw PLC, Wotton-Under-Edge (GB)

( * ) Notice: Subject to any disclaimer, the term of this patent is extended or adjusted under 35 U.S.C. 154(b) by 821 days.

(21) Appl. No.: 12/451,125

(22) PCT Filed: Apr. 28, 2008

(86) PCT No.: PCT/GB2008/001471
§ 371 (c)(1),
(2), (4) Date: Oct. 27, 2009

(87) PCT Pub. No.: WO2008/135718
PCT Pub. Date: Nov. 13, 2008

(65) Prior Publication Data
US 2010/0135357 A1 Jun. 3, 2010

(30) Foreign Application Priority Data

May 3, 2007 (GB) .................................. 07356060.9

(51) Int. Cl.
| | | |
|---|---|---|
| *G01K 1/14* | (2006.01) | |
| *G01K 7/02* | (2006.01) | |
| *G01K 1/18* | (2006.01) | |
| *G01K 7/04* | (2006.01) | |
| *G01K 15/00* | (2006.01) | |
| *G01B 5/00* | (2006.01) | |
| *G01K 7/42* | (2006.01) | |

(52) U.S. Cl.
CPC ................ *G01B 5/0014* (2013.01); *G01K 1/18* (2013.01); *G01K 7/04* (2013.01); *G01K 15/00* (2013.01); *G01K 7/42* (2013.01)
USPC ............................. 374/179; 374/208; 136/230

(58) Field of Classification Search
USPC ................................... 136/221; 374/179, 208
See application file for complete search history.

(56) References Cited

U.S. PATENT DOCUMENTS

| | | | | |
|---|---|---|---|---|
| 3,151,484 A | * | 10/1964 | Mohn et al. .................... | 374/147 |
| 4,265,117 A | * | 5/1981 | Thoma et al. ................. | 136/221 |
| 4,444,990 A | * | 4/1984 | Villar ............................. | 136/221 |
| 4,527,005 A | * | 7/1985 | McKelvey et al. ............ | 136/221 |
| 4,979,831 A | * | 12/1990 | Schertz et al. ................ | 374/158 |
| 4,997,278 A | | 3/1991 | Finlan et al. | |

(Continued)

FOREIGN PATENT DOCUMENTS

| | | |
|---|---|---|
| DE | 92 09 556 UI | 10/1992 |
| DE | 103 58 778 A1 | 7/2004 |

(Continued)

*Primary Examiner* — Mirellys Jagan
(74) *Attorney, Agent, or Firm* — Oliff PLC

(57) ABSTRACT

A temperature sensor is described that comprises a temperature sensing element, a substantially thermally insulating substrate having a first side and a second side and at least one layer of substantially thermally conductive material coated on the first side of the substrate. A first hole is provided on the second side of the substrate and the temperature sensing element is arranged to sense temperature within the first hole. A plurality of additional holes may also be provided on the second side of the substrate, these holes may be coated to aid thermal transfer. The temperature sensing element may be a thermocouple. The temperature sensor may be included in a temperature measurement probe for use in measuring the temperature of workpieces produced using a machine tool.

26 Claims, 5 Drawing Sheets

(56) References Cited

U.S. PATENT DOCUMENTS

| | | | |
|---|---|---|---|
| 5,176,451 A * | 1/1993 | Sasada et al. | 374/179 |
| 5,195,826 A | 3/1993 | Enderle et al. | |
| 5,399,019 A * | 3/1995 | Kourtides | 374/208 |
| 6,592,253 B2 * | 7/2003 | Nyffenegger et al. | 374/143 |
| 6,830,374 B1 * | 12/2004 | Gray | 374/179 |
| 7,517,145 B2 * | 4/2009 | Seo et al. | 374/147 |
| 2007/0116087 A1 * | 5/2007 | Hsu | 374/147 |
| 2007/0217480 A1 * | 9/2007 | Lai | 374/208 |
| 2007/0284430 A1 * | 12/2007 | Rock | 235/375 |

FOREIGN PATENT DOCUMENTS

| | | |
|---|---|---|
| JP | A-59-200932 | 11/1984 |
| JP | A-60-004832 | 1/1985 |
| WO | WO 2004/090492 A2 | 10/2004 |

* cited by examiner

TEMPERATURE SENSING APPARATUS

The present invention relates to temperature sensing apparatus and in particular to a temperature sensor for use with co-ordinate positioning apparatus.

BACKGROUND

Temperature sensors suitable for measuring the temperature of a workpiece located on co-ordinate positioning apparatus are known. Such temperature sensors enable the precision of acquired dimensional measurements to be improved by allowing any thermal expansion effects of the workpiece to be taken into account. Such temperature sensors may be incorporated into temperature measurement probes that can be mounted in the spindle of a machine tool or held by the measurement arm or quill of a dedicated co-ordinate measurement machine (CMM). In this manner, temperature measurements can be taken as part of an automated production or inspection process.

An example of a temperature measurement probe for use with a CMM is described in U.S. Pat. No. 4,997,278. The temperature measurement probe of U.S. Pat. No. 4,997,278 comprises a temperature sensor in the form of a platinum resistor attached to a copper disk. The temperature sensor is brought into engagement with the surface of a workpiece and maintained in thermal contact until thermal equilibrium is reached.

Temperature sensors operating using the thermocouple principle are also known. A thermocouple is made of two different metals welded at one end. When the welded end (termed the "hot-junction") is heated, a voltage related to the temperature variation is generated at the other end (termed the "cold-junction"). The thermocouple cold-junction is typically attached to an appropriate electronics stage for signal management.

Another example of a known temperature sensor design can be found in DE9209556U. The temperature sensing device comprises a metal disk to which a thermocouple or thermistor is soldered. The disk is attached to a handle by an elongate cylinder of material, such as ceramic or silicone rubber, having a low thermal conductivity. A central opening in the cylinder provides a conduit for wires to pass from the disk to the electronics contained in the handle of the device.

SUMMARY

According to a first aspect of the present invention, a temperature sensor comprises; a temperature sensing element and a substantially thermally insulating substrate having a first side and a second side, wherein the first side of the substantially thermally insulating substrate carries a coating that comprises at least one layer of substantially thermally conductive material, wherein a first hole is provided on the second side of the substrate and the temperature sensing element is arranged to sense temperature within the first hole.

The present invention thus provides a temperature sensor comprising a substantially thermally insulating substrate that is formed from material having a low thermal conductivity. At least one layer of thermally conductive material, such as a metal, that has a high thermal conductivity is coated or deposited on the first (outer) side of the substrate. As outlined in more detail below, the layer(s) of thermally conductive material preferably forms the outer face of the temperature sensor that is brought into contact with the object to be measured. The second (inner) side of the substrate is arranged such that a first opening or hole is defined and the temperature sensing element is arranged to measure temperature within that first hole. The temperature sensing element may conveniently comprise a contact temperature sensing element located, at least partially, within said first hole or a non-contact temperature sensing element located outside the first hole but arranged to sense the temperature of a surface within the first hole.

A temperature sensor of the present invention has the advantage that it can be fabricated so as to have a very low thermal mass. For example, the layer(s) of thermally conductive material coated on the first (outer) side of the substrate may have a total thickness of much less than one millimeter or more preferably a thickness of less than one hundred micrometers. The insulating substrate may be thicker than the conductive layers thereby providing physical strength without adding significantly to the thermal mass of the sensor. A temperature sensor of the present invention is thus both robust (e.g. suitable for use in a machine shop environment) and has a low effective thermal mass thereby allowing temperature measurements to be acquired more quickly than is possible using prior art devices.

The provision of a conductive coating on a substrate in accordance with the present invention is especially advantageous compared with prior art devices of the type described above that sense temperature using a temperature sensing element attached to a preformed metal disk. In particular, providing a coating on a substrate instead of using a preformed metal disk allows the effective thermal mass of the active temperature sensing region to be greatly reduced (e.g. by one or more orders of magnitude) without significantly reducing the mechanical robustness of the device. This, in turn, reduces the response time of the measurement sensor. The present invention thus allows lower thermal mass (higher speed) sensors to be produced that are sufficiently robust for operation in a machine tool environment.

The temperature sensor may comprise any type of temperature sensing element. As outlined above, the temperature sensing element may be a contact or non-contact temperature sensing element. If a contact temperature sensing element is located within the first hole, it is preferred that such a temperature sensing element has a low thermal mass. Conveniently, the temperature sensing element comprises the hot junction of a thermocouple. Alternatively, a low thermal mass thermistor or micro-thermistor may be provided.

Advantageously, the effective thermal mass of the temperature sensor is less than 0.5 g, more preferably less than 0.1 g, more preferably less than 0.05 g, and more preferably around 0.02 g or less. The effective thermal mass of a temperature sensor of the present invention can thus be significantly lower than that of temperature sensors that comprise preformed metal disks or the like.

Conveniently, the first hole extends from the second side through to the first side of the substrate. In other words, the first hole may be a blind hole or blind micro-via that extends through the entire thickness of the substrate. A bottom of the first hole may then be formed by the one or more layers of thermally conductive material that are located on the first (outer) side of the substrate. This arrangement has the advantage that the temperature sensing element can be placed in intimate thermal contact with the thermally conductive layers that form the outer face of the temperature sensor.

Advantageously, the internal surfaces of the first hole (e.g. the hole in which the temperature sensing element is located) are coated with thermally conductive material; e.g. a thin metal coating, such as copper, may be provided. If the first hole extends all the way through the substrate, it can also be seen that the coating applied to the first hole will be in direct thermal contact with the layer(s) of thermally conductive material located on the first side of the substrate. Preferably, the temperature sensing element is welded into the first hole. This arrangement provides efficient heat transfer to the temperature sensing element.

Conveniently, a plurality of additional holes or blind micro-vias are provided on the second side of the substrate. These additional holes may be located on the substrate in an arrangement that laterally surrounds or encircles the first hole. In this manner, additional heat paths may be provided (e.g. by applying a conductive coating to the additional holes as described below) from the thermally conductive material on the first side of the substrate to the temperature sensing element. The thermal resistance of the sensor can thus be reduced without significantly reducing the mechanical rigidity of the substrate.

As outlined above, a conductive material, such as a copper, may be provided on the internal surface of the first hole which contains the temperature sensing element. Conductive material may also be provided on the internal surface of any of said additional holes and/or on a region of the second surface of the substrate in the vicinity of the first and any additional holes. In a preferred embodiment, the surfaces of the first hole, additional holes and second side of the substrate may be coated with a continuous conductive layer. For convenience, the whole conductive layer may be deposited using a single deposition process. This arrangement has been found to provide a high rate of thermal transfer from the thermally conductive layers located on the first (outer) side of the substrate to the temperature sensing element. In particular, this preferred arrangement can be seen to provide a temperature sensing element (e.g. a thermocouple) that is fixed (e.g. welded) within a first hole or micro-via and is also embedded between the two conductive coatings provided on the first and second sides of the substrate. The conductive coatings carried on the first and second sides of the substrate thus provide two thermal collectors that are thermally linked to one another by the conductive material within the additional holes or micro-vias formed in the substrate. Heat is thus transferred to the temperature sensing element from all (e.g. x, y, z) directions. Such an arrangement can be seen to provide more efficient heat transfer than prior art devices in which a temperature sensing element is simply welded on to the surface of a metal disk and heat transfer occurs along only a single direction (e.g. the z-axis) that is perpendicular to the disk surface.

Advantageously, the at least one layer of thermally conductive material that is located on the first side of the substrate comprises one or more layers of metal. Although any suitable metal may be used, the one or more layers of metal may conveniently comprise at least one of a copper layer and a nickel layer. For example, a copper layer may be placed directly on the first side of the substrate and an outer coating of nickel may then be deposited on the copper. The nickel layer may be thinner than the copper layer and provide a mechanically robust outer layer. To minimise thermal mass, the copper layer thickness is preferably less than 1 mm, more preferably less than 500 µm, more preferably less than 250 µm, more preferably less than 100 µm, more preferably less than 50 µm, or more preferably less than 20 µm. The outermost nickel layer thickness is preferably less than 50 µm, more preferably less than 20 µm, or more preferably less than 10 µm.

The substantially insulating substrate may be formed from any material(s) having a low thermal conductivity. The substrate may comprise a single layer of material or may comprise multiple layers of material. It is preferred that the substrate is substantially rigid or stiff in order to provide mechanical support for the coating of one or more layers of substantially thermally conductive material that are applied to its first side. Advantageously, the substrate is a substantially planar or flat substrate. In particular, the thickness of the substrate is preferably (much) less than the width (e.g. diameter) of the substrate. Conveniently, the substrate comprises at least one of fibreglass and ceramic. In a preferred embodiment, the substrate comprises a fibreglass layer of the type used to form printed circuit boards (PCBs). The layers of conductive material mentioned above may then also be provided using PCB production processes.

The temperature sensor of the present invention may be used for any temperature sensing application. However, the robustness of the temperature sensor makes it particularly suited for use in harsh operating environments such as those found in machine shops. A temperature sensing probe may thus advantageously comprise the above described temperature sensor. The temperature sensing probe may be designed for use with machine tools, co-ordinate measuring apparatus or any other type of co-ordinate positioning apparatus.

The temperature sensing probe may conveniently comprise a probe body. The probe body may be attached to a shank or similar that in turn can be attached to the spindle or quill of a machine. A stylus is advantageously provided that protrudes from the probe body. The stylus conveniently comprises a shaft carrying a sensor head that comprises said temperature sensor. The sensor head preferably comprises a spring mechanism to allow movement of the sensor head relative to the shaft; this ensures good contact between the temperature sensor and the object to be measured. The sensor head is conveniently arranged such that the temperature sensor is substantially thermally isolated from the rest of the sensor head. In this manner, the thermal mass associated with temperature sensing is minimised.

The probe body preferably comprises an electronics stage for processing signals generated by the temperature sensing element of the temperature sensor. Conveniently, the electronics stage is substantially thermally isolated from the external environment. For example, the probe body may comprise a plastic walled box in which the electronics stage is substantially enclosed. At least one air gap may also be provided between the outer casing of the probe body and said plastic walled box. Furthermore, the outer casing of the probe body may comprise thermally conductive material (e.g. a metallic coating).

As mentioned above, the temperature sensing element of the temperature sensor may comprise the hot-junction of a thermocouple. In such a case, the electronics stage may comprise the cold junction of the said thermocouple. The thermocouple wires may extend from the temperature sensor to the electronics stage through the hollow core of the stylus shaft. It may then be arranged such that, in use, the electronics stage is sufficiently thermally insulated from the external environment so that any variations in the temperature of the electronics stage occur with a slower time constant than the time constant of the cold junction. In this manner, errors in temperature measurement from external variations in temperature are mitigated.

The temperature measurement probe may be connected to an external interface or controller via a wireless or wired link. Advantageously, the measurement probe further comprises the first part of a wireless (e.g. RF or optical) communications link. The second part of said wireless communications link may then be provided on an associated interface. In this manner, wireless communications can be established between the probe and the associated interface. In a preferred embodiment, the measurement probe and interface provide a Bluetooth radio link.

One or more of the above described temperature sensors may also be used to provide temperature measurement apparatus that is suitable for monitoring the temperature at one or more positions on or around a machine. This may allow, for example, the temperature of parts or machine components to be monitored. In particular, temperature measurement apparatus may be provided that comprises a control box and a plurality of the above described temperature sensors. Advantageously, each of said plurality of temperature sensors comprises the hot junction of a thermocouple and the control box comprises electronics stage that comprises the cold junction of each of the thermocouples. Electrical leads may extended from the temperature sensors to the control box.

The control box may be hardwired to an interface or may comprise the first part of a wireless communications link. The second part of the wireless communications link may be provided on an associated interface thereby allowing wireless communications to be established between the control box and the associated interface. If a wireless link is provided, it may be analogous to that described above for the temperature measurement probe thereby allowing an interface to be provided that can communicate with the control box and the temperature measurement probe.

Advantageously, the temperature sensing probe or temperature measurement apparatus comprises a processor for monitoring a series of temperature readings acquired by the temperature sensor. Conveniently, the processor is arranged to monitor temperature readings acquired after the sensor contacts an object and to determine when a pseudo-stable temperature is reached at which the temperature readings vary with time but at less than a predetermined rate. The processor may be also arranged to implement any of the steps of the method described below. For example, the processor may be arranged to store or interrogate a look-up table and/or to predict the object temperature in the manner described above. The processor may be located within the measurement probe or within the associated interface.

Temperature readings taken using the above described temperature sensors may be processed in a number of different ways as required. Advantageously, a method of determining the temperature of an object comprises the steps of (i) bringing the temperature sensor into thermal contact with the object to be measured; (ii) using the temperature sensor to acquire a plurality of temperature readings, said plurality of temperature readings being acquired prior to the temperature sensor reaching thermal equilibrium with the object; and (iii) using at least some of the plurality of temperature readings of step (ii) to determine a pseudo-stable temperature at which the rate of change of temperature readings with time is less than a predetermined rate.

Such a method thus allows the temperature of an object, such as a part or workpiece, to be measured. As outlined in more detail below, the temperature sensor and object are typically at different temperature before thermal contact is established. The initial rate at which the temperature of the sensor changes is thus very rapid, but this rate decreases as thermal equilibrium is approached. Even if the temperature sensor has a very low thermal mass, it can still take several minutes for true thermal equilibrium with the object to be reached.

The prediction method comprises taking a series of temperature readings or measurements whilst the temperature sensor is being heated, or cooled, by the object. A pseudo-stable temperature can then be found from these reading; the pseudo-stable temperature being a temperature at which the rate of change of the sensor temperature with time is lower than a certain (predetermined) rate. It should be noted that the temperature sensor may initially be hotter or colder than the object; the rate of change of temperature readings thus refers only to the magnitude (and not the sign) of such temperature changes. For a low thermal mass temperature sensor, a suitable pseudo-stable temperature can typically be found within only a few seconds of contact. Such a pseudo-stable temperature can then be used, as described in more detail below, as the basis for accurately predicting the true temperature of the object.

Advantageously, the method also comprises the step (iv) of predicting the temperature of the object using the pseudo-stable temperature determined in step (iii). The prediction may conveniently comprise the step of determining a start temperature, the start temperature being the temperature of the temperature sensor prior to thermal contact being established with the object. The start temperature may be readily found from one or more temperature readings that are taken prior to the sensor being brought into contact with the object.

Once the start temperature and pseudo-stable temperature have been found, the step may be advantageously performed of determining a difference temperature ($\Delta T$) between the pseudo-stable temperature and the start temperature. For example, the start temperature may be subtracted from the pseudo-stable temperature to provide the difference temperature. It has been found that the difference temperature ($\Delta T$) is directly related to the difference between the pseudo-stable temperature and the actual temperature of the object. Step (iv) may thus advantageously comprise predicting the temperature of the object by applying a correction to the pseudo-stable temperature, wherein the applied correction depends on the difference temperature ($\Delta T$). It should, of course, be noted that if the start temperature is invariant between measurements (e.g. if the temperature sensor is heated or cooled to a certain temperature before each measurement) the correction to be applied will then depend on just the pseudo-stable temperature.

Advantageously, a look-up table may be provided that comprises a plurality of predetermined corrections for a plurality of different difference temperatures ($\Delta T$). The correction that is applied to the pseudo-stable temperature to provide a predicted object temperature may thus be conveniently determined by reference to the look-up table. The correction in the look-up table that most closely corresponds to the difference temperature may be used. Advantageously, use of the look-up table may comprise the step of taking at least two of said predetermined corrections and using an interpolation process to calculate the correction that is applied to the pseudo-stable temperature. In this manner, a correction can be calculated using a look-up table having relatively few entries.

The method may advantageously comprise an initial calibration routine for determining said look-up table. In other words, the look-up table may be populated with data relating to the difference temperature and the correction that is required to convert the pseudo-stable temperature to the actual object temperature. The initial calibration routine may thus comprise determining a start temperature, a pseudo-stable temperature and an equilibrium (actual) temperature. The object and/or sensor may be heated and/or cooled as required to provide the range of difference temperatures that are required for the look-up table. Although each measurement performed during the calibration routine may take several minutes (i.e. so the thermal equilibrium is reached), the routine can be performed once or infrequently. For example, the LUT may be calculated during manufacture and/or periodically as part of a full system calibration.

The method may comprise performing step (ii) to collect a series of temperature readings and then subsequently performing step (iii) to analyse those readings to establish a pseudo-stable temperature. For example, temperature readings may be collected for a certain period of time (e.g. 10 seconds) and then analysed to determine a pseudo-stable temperature. Advantageously, steps (ii) and (iii) are performed in parallel such that said temperature readings are monitored whilst, or shortly after, being acquired in order to determine when the pseudo-stable temperature is reached. In other words, a series of temperature readings may be monitored until a pseudo-stable temperature is found. Once the pseudo-stable temperature has been found, the sensor may be withdrawn from the object.

According to a second aspect of the invention, a method of manufacturing a temperature sensor comprising the steps, in any suitable order, of (i) taking a thermally insulating substrate having a first side and a second side; (ii) coating at least one layer of substantially thermally conductive material on to the first side of the substrate; (iii) forming a first hole on the second side of the substrate; and (iv) placing at least part of a temperature sensing element within said first hole. Step (iv) may comprise fixing, for example welding, the temperature sensing element in the first hole.

BRIEF DESCRIPTION OF THE DRAWINGS

The invention will now be described, by way of example only, with reference to the accompanying drawings in which.

DETAILED DESCRIPTION OF THE EMBODIMENTS

Figure 1:
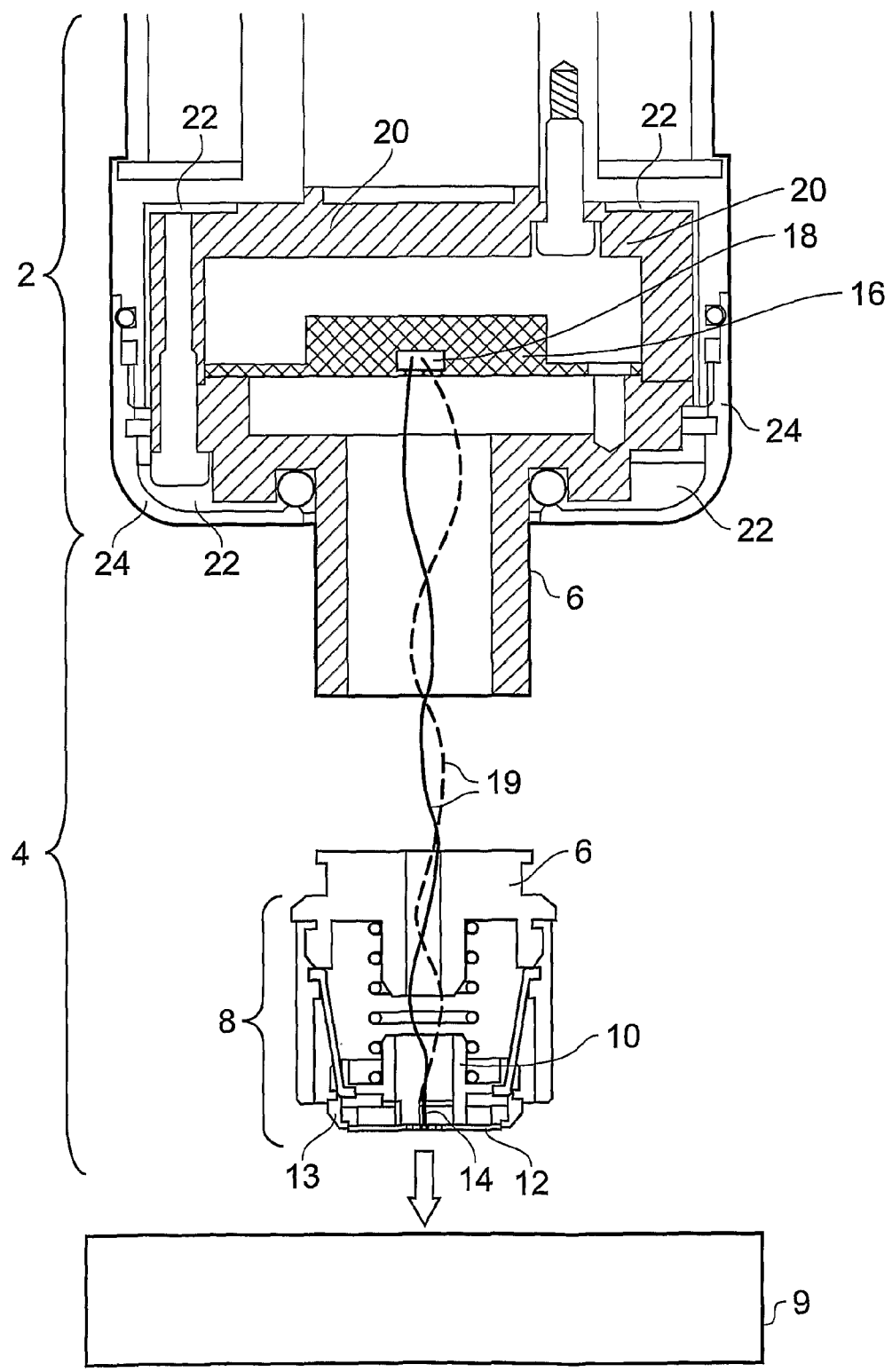
FIG. 1 illustrates a temperature measurement probe of the present invention.

Referring to FIG. 1, a cross-sectional view of a temperature measurement probe of the present invention is illustrated. The temperature measurement probe comprises a probe body 2 having a protruding stylus 4. The stylus 4 comprises a shaft 6 and a sensor head 8. The proximal end of the stylus shaft 6 is attached to the probe body 2 and the distal end of the stylus shaft 6 is attached to the sensor head 8.

The sensor head 8 comprises a mechanical sensor housing 10 to which a temperature sensor 12 is mounted. The temperature sensor 12 includes the hot junction 14 of a thermocouple and is described in more detail below with reference to FIGS. 2 to 4. The mechanical sensor housing 10 is flexibly mounted to the upper part of the sensor head 8 via a spring mechanism that presses the sensing face into contact with a workpiece 9; this is described in more detail below with reference to FIG. 5. A rubber sealing portion 13 may also be provided that seals the internal part of the temperature sensor from the external environment but is sufficiently flexible so that freedom of movement of the mechanical sensor housing 10 is not inhibited.

The probe body 2 comprises an electronics stage 16 that includes the cold junction 18 of the thermocouple. A pair of wires 19 extend though the hollow core of the stylus shaft 6 from the thermocouple hot junction 14 located within the sensor head 8 to the thermocouple cold junction 18 of the electronics stage 16. The electronics stage 16 is enclosed in a thick walled plastic box 20 that is surrounded by an air gap 22 and includes a metallic cover 24. This arrangement gives a high thermal inertia and provides a constant temperature gradient within the electronics stage 16. The electronics stage 16, which includes the cold junction 18 of the thermocouple, is thus substantially protected from any outside temperature variations.

It is important to note that that any variations in the temperature of the electronics stage 16 that are quicker than the electronic and cold junction time constant will add error to the resulting measurement of temperature at the hot junction. The probe body 2 thus provides that any temperature variations within the electronics stage 16 are typically slower than the time constant associated with the electronics of the cold junction. In this manner, the cold junction is isolated from any temperature variations that occur more quickly than its time constant and hence the errors associated with measuring the temperature at the hot junction are reduced.

To further improve the thermal isolation of the electronics stage 16, the stylus 6 attached to the probe body 2 is formed from a plastic material. This isolates the probe body from any heating (or cooling) of sensor head 8 and also thermally isolates the wires 19 of the thermocouple.

The arrangement shown in FIG. 1 comprises a small diameter stylus 4; the shaft 6 and sensor head 8 being of approximately the same diameter. The external diameter of the stylus 4 can be less than 20 mm or even less then 10 mm. Such a small diameter stylus allows the probe to access recessed surfaces, bores etc. Larger diameter styli can be provided as necessary.

Figure 2:
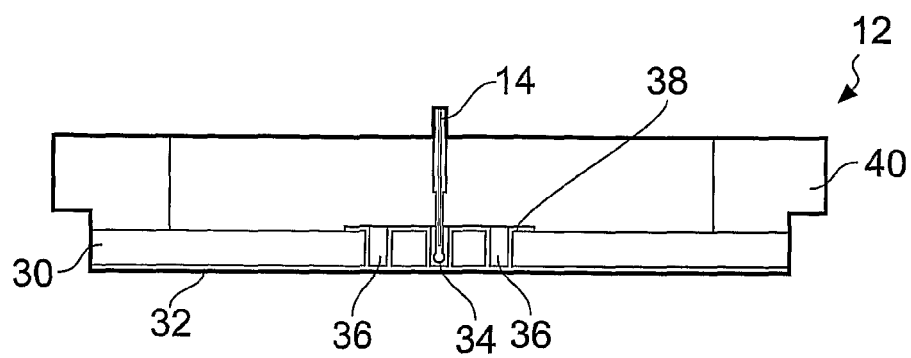
FIG. 2 shows a cross-sectional view through a temperature sensor of the present invention.
Figure 3:
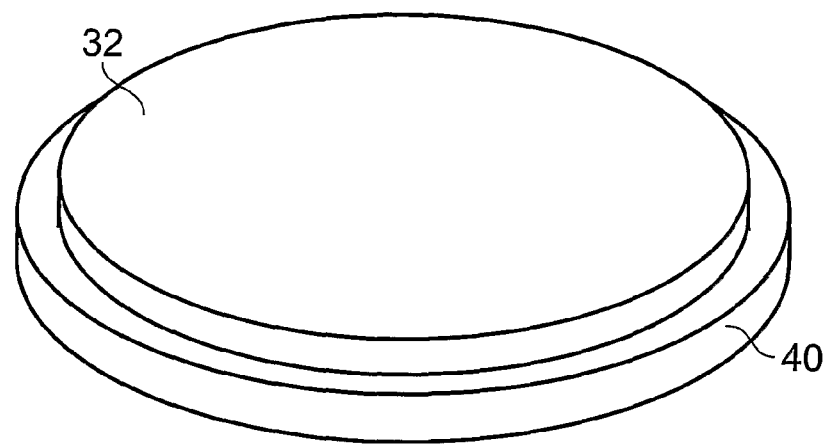
FIG. 3 shows the outer, workpiece contacting, surface of the temperature sensor of FIG. 2.
Figure 4:
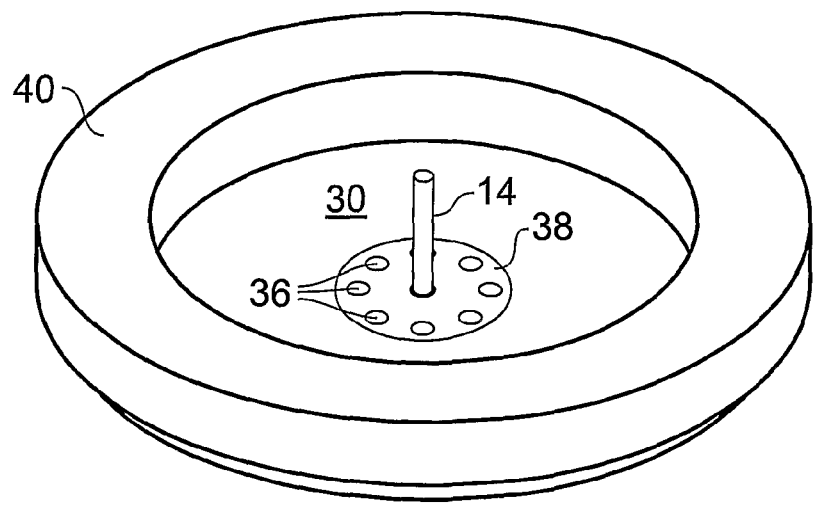
FIG. 4 shows the inner surface of the temperature sensor of FIG. 2.

Referring to FIGS. 2 to 4, the structure and operation of the temperature sensor 10 described with reference to FIG. 1 will be outlined in more detail.

As shown in FIG. 2, the temperature sensor 12 comprises a substrate 30 having an outer conductive coating 32. The substrate 30 also comprises a thermocouple via 34 in which the thermocouple hot junction 14 is located and eight further vias 36. A copper coating 38 is provided at the central region of the inner surface of the substrate 30 which also coats the internal surfaces of the vias 34 and 36. A plastic ring 40 is glued to the substrate 30 so that the temperature sensor can be mounted to the mechanical sensor housing 10 of the probe head 8.

The substrate 30 is formed from a thin (typically less than 0.3 mm) layer of fibreglass material. Fibreglass is preferred as it has a low thermal conductivity and a high glass transition temperature thereby preventing mechanical deformation occurring when, as described below, the thermocouple is welded into the central via 34. A suitable type of fibreglass is the RO4350B product commercially available from Rogers Corporation, Connecticut, USA.

The skilled person would recognise the many types of fibreglass and other materials that could alternatively be used to provide the substrate 30. For example, ceramic material could alternatively provide the sensor substrate. Although ceramics typically have a higher thermal conductivity than fibreglass, they are generally more mechanically robust and hence more suited to use in harsher environments (e.g. as part of a fixed probe mounted inside a machine tool). In other words, the reduced temperate response time associated with using a substrate having reduced insulation properties may be an acceptable trade off if increased mechanical robustness is required.

The thermally conductive coating 32 is provided on the outer surface of the substrate. The outer surface on which the coating 32 is located provides the face of the temperature sensor 12 that contacts the part or workpiece that is to be measured; the outer face of the temperature sensor is shown in FIG. 3. The coating 32 comprises a thin layer (e.g. several micrometers) of copper attached to the substrate 30 and an outermost thin layer (e.g. a few micrometers) of nickel. The thin layers of copper and nickel provide a high thermal conductivity, and also have a low thermal mass. The outermost nickel layer is mechanically tough and protects the sensor from mechanical or chemical damage during use.

It should be noted that although a dual layer (copper/nickel) thermally conductive coating 32 is described in this example, any thermally conductive material could be used. Additionally, the provision of a separate outer, protective, layer is optional and may be unnecessary in certain situations; e.g. if the sensor is to operate in a relatively benign environment.

As shown in FIGS. 2 and 4, the substrate comprises a central via or hole 34 for receiving the thermocouple. Eight further vias or holes 36 are evenly spaced in a circular arrangement around the central via 34. The internal face of the substrate 30 is also covered with a thin (e.g. several micrometers) layer of copper 38. The copper layer 38 extends a radial distance from the central via 34 and also coats the internal surfaces of the central via 34 and the further vias 36.

The central via 34 receives the hot-junction 14 of the thermocouple. In this example, the thermocouple is a K-type micro-thermocouple formed using wires having a diameter less than 100 μm thereby providing a hot junction size that is less than approximately 0.2 mm to 0.3 mm. It should, however, be noted that thicker wires could be used if required. The thermocouple is welded in the central via 34 after the copper layer 38 has been deposited; this helps to maximise heat transfer to the thermocouple. It should be noted that other types of thermocouple (e.g. T, J, N etc) may be used or other types of temperature sensing devices (e.g. thermistors) could alternatively be provided. Furthermore, welding is only one possible technique that could be used to secure the thermocouple in the central via 34; the skilled person would appreciate the many alternative attachment methods (e.g. gluing, soldering etc) that could be employed. Although contact temperature sensing devices are described in detail herein, non-contact temperature sensing devices could also be used. For example, a thermal (infra-red) detector could be located so as to measure the temperature of a surface within the central via 34.

As shown in FIG. 2, the tip of the thermocouple (i.e. the hot-junction formed by welding the two wires together) is located substantially adjacent to the thermally conductive coating 32. The copper coating on the internal surfaces of the vias 34 and 36 also aids heat transfer from the external conductive coating 32 to the internal copper coating 38. In this manner, a central sensing region or island of the substrate is provided that contains the hot-junction of the thermocouple and is substantially thermally isolated from the surrounding area.

The central region of the temperature sensor that surrounds the thermocouple hot-junction 14 thus has a very low thermal mass. In this example, the thermal mass is around 0.02 grams and the central region of the substrate has a diameter of around 9 mm. Furthermore, the temperature sensor 12 provides a high rate of heat transfer to the thermocouple hot-junction 14 from a workpiece that is brought into contact with the external conductive coating 32. This provides an efficient, low thermal mass, heat collection structure that allows the temperature of a workpiece to be found accurately and quickly. The low thermal mass of the temperature sensor 12 also has the advantage of not significantly modifying the temperature of the workpiece being measured.

It should be noted that the temperature sensor arrangement described with reference to FIGS. 2 to 4 is particularly suited to use as part of a temperature measurement probe of the type described with reference to FIG. 1. In particular, the thermal isolation of the cold junction provided by the probe body 2 combined with the low thermal mass and fast heat transfer properties of the sensor 12 permits rapid, high accuracy, temperature measurement. It should, however, be noted that the temperature sensor 12 may be used with cold-junction electronics other than those described with reference to FIG. 1. Furthermore, the temperature sensor 10 may be used in any temperature sensing application and not simply as part of temperature measurement probe devices or the like.

Figure 5:
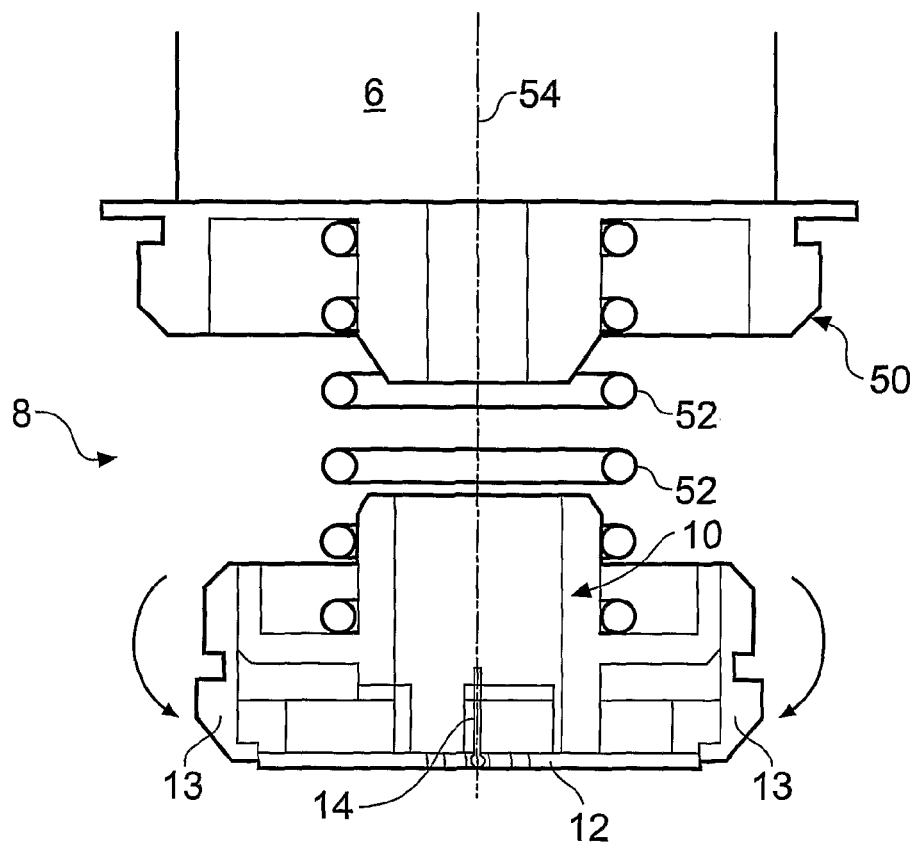
FIG. 5 provides an expanded view of the mechanical stage of the temperature measurement probe of FIG. 1.

Referring to FIG. 5, the mechanical aspects of the temperature sensor head 8 of the temperature measurement probe described with reference to FIG. 1 are shown in more detail. As described above, the temperature sensor head 8 comprises a mechanical sensor housing 10 for holding the temperature sensor 12. An end part 50 is located at the distal end of the stylus shaft 6. A spring loaded mechanism comprising a coil spring 52 is provided to attach the end part 50 to the mechanical sensor housing 10. The mechanical sensor housing 10 has thin walls and is formed from plastic material having a low thermal conductivity. The area of contact between the sensor housing 10 and the temperature sensor 12 is also minimised to reduce heat transfer.

The spring loaded arrangement of FIG. 5 thus gives angular freedom to the temperature sensor 12 thus allowing the temperature probe to check workpiece surfaces that are not parallel to the contact sensor. In particular, the spring gives enough angular freedom to provide flush contact between the temperature sensor 12 and surfaces angled up to 5° or 10° away from the plane orthogonal to the longitudinal probe axis 54. The arrangement also avoids mechanical deformation of the temperature sensor 12 thereby maintaining sensor flatness and minimising heat loss. In addition, the spring loaded mechanism also allows the temperature sensor 12 to be biased into intimate contact with the workpiece. The pressure force of the spring is also applied, via the mechanical sensor housing 10, through the centre of the temperature sensor 12 thereby ensuring that optimum contact is maintained with the workpiece. Providing pressure between the workpiece and the temperature sensor 12 in this manner reduces the thermal resistance between the sensor and the workpiece thereby increasing the efficiency of thermal transfer therebetween. The efficiency of temperature detection is thus improved further.

Figure 6:
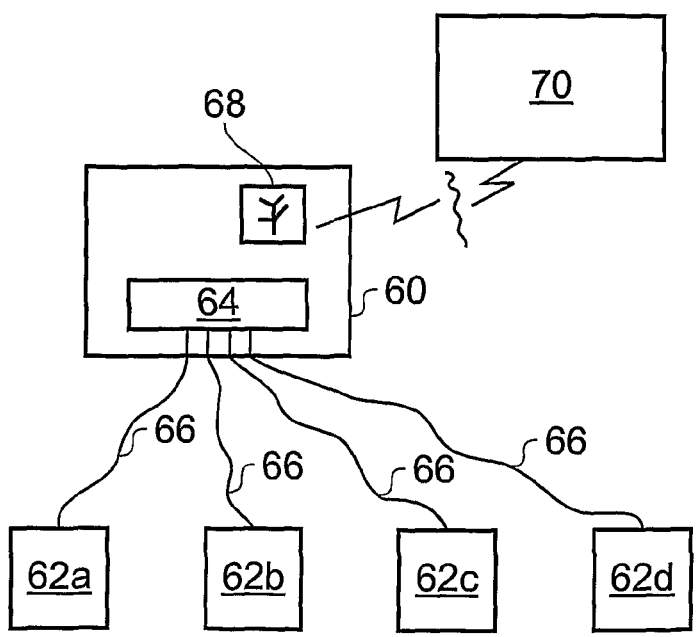
FIG. 6 show alternative temperature measurement apparatus incorporating temperature sensors of the present invention.

Referring to FIG. 6, distributed temperature measurement apparatus incorporating a plurality of the above described temperature sensors is shown. The apparatus comprises a control box 60 and four temperature sensors 62a-62d of the type described with reference to FIGS. 2 to 4 above. Each temperature sensor 62 is connected to the electronics stage 64 of the control box 60 by an insulated lead 66. The electronics stage 64 thus forms the cold junction of the temperature sensors 62. The control box also comprises a wireless (RF) module 68 for communicating with an associated interface 70.

In use, the temperature sensors 62 may be mounted on a bracket and attached to different parts of the machine as required by a user. The temperature of machine components may thus be monitored. The temperature sensors 62 may also be attached to different regions of a workpiece to allow workpiece temperature to be measured during a machine process. In one example, the control box 60 may be mounted to a pallet that also hold a workpiece. The temperature sensors may then be attached to regions of that workpiece. The pallet may be loaded into a machine tool whereupon temperature data is passed to the machine tool control apparatus from the control box via the interface 70. In this manner, temperature data can be monitored during the machining process.

Although the temperature sensor described herein is particularly suited to use in a temperature measurement probe or distributed temperature measurement apparatus of the type described above, it could also be used in a wide variety of different applications. In fact, the temperature sensor could be used in any application where rapid temperature sensing is required.

A rapid and accurate method of predicting temperature using the above described temperature sensor now be described with reference to FIGS. 7 to 9.

Figure 7:
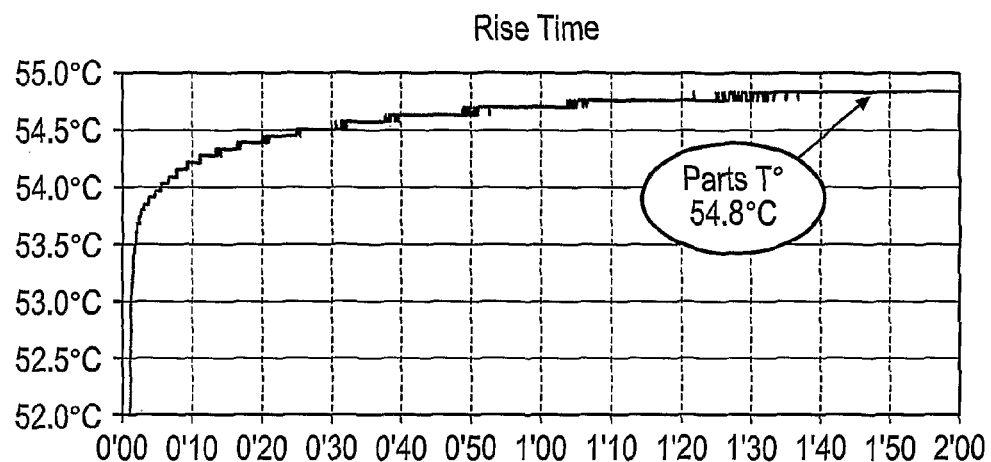
FIG. 7 shows a plot of temperate versus time when the temperature sensor of the present invention is brought into contact with an object.

FIG. 7 is a plot of temperature versus time data acquired when a temperature sensor of the type described above is brought into contact with an object, such as a workpiece or part. It can be seen that the low thermal mass of the temperature sensor ensures that there is a very rapid rise from the initial (ambient) starting temperature to a temperature that is very close (e.g. to within a few degrees Celsius) to the actual temperature of the part. However, it can also be seen from FIG. 7 that it can still take several minutes before the temperature sensor provides a temperature reading that accurately (e.g. to within 0.1° C.) corresponds to the temperature of the part.

To predict the temperature of the part, a pseudo-stable temperature is found. This is achieved by analysing the measured temperature values or readings acquired after the sensor makes contact with the object and ascertaining when the temperature rise first falls below a certain rate.

Figure 8:
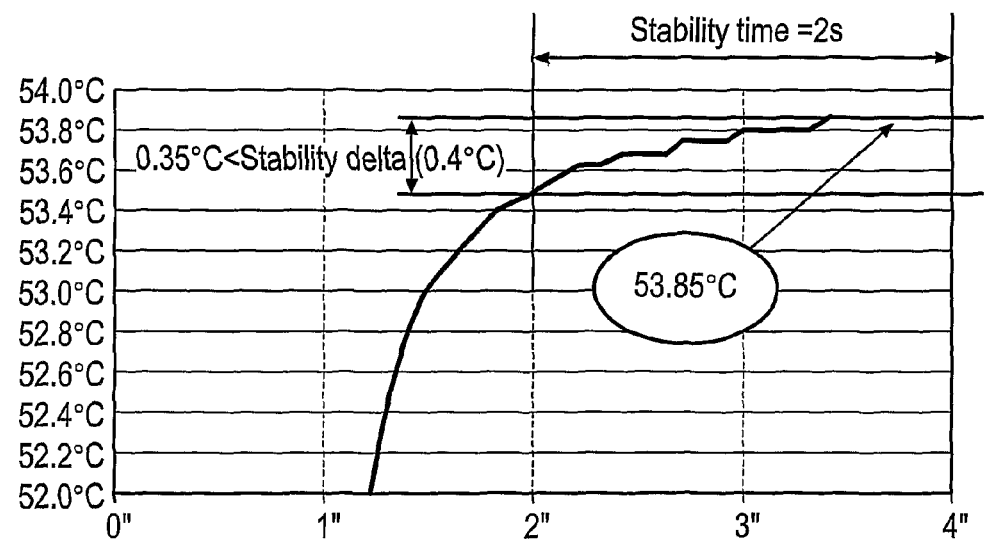
FIG. 8 is shows the pseudo-stable temperature region of the plot of FIG. 7 in more detail.

FIG. 8 plots the first four seconds of temperature data that are shown in FIG. 7. In this example, pseudo-stability is defined as being achieved when the temperature rise becomes less than 0.4° C. in any two second period of time (this is the so-called stability delta). The pseudo-stable temperature can, in this case, be seen to be 53.85° C. and this value is achieved within four seconds. It is important to note that the temperature sensor is not in thermal equilibrium with the object when the pseudo-stabile temperature is reached and would therefore continue to rise in temperature for several more minutes if thermal contact was maintained. In other words, the pseudo-stable temperature region is located on the rising edge of the temperature versus time plot outside of the thermal equilibrium region.

It has been found that the actual temperature of the object is related to the difference between the start temperature (i.e. the temperature of the temperature sensor immediately before being brought into contact with the object) and the above described pseudo-stable temperature. This temperature difference value can be termed ΔT.

Figure 9:
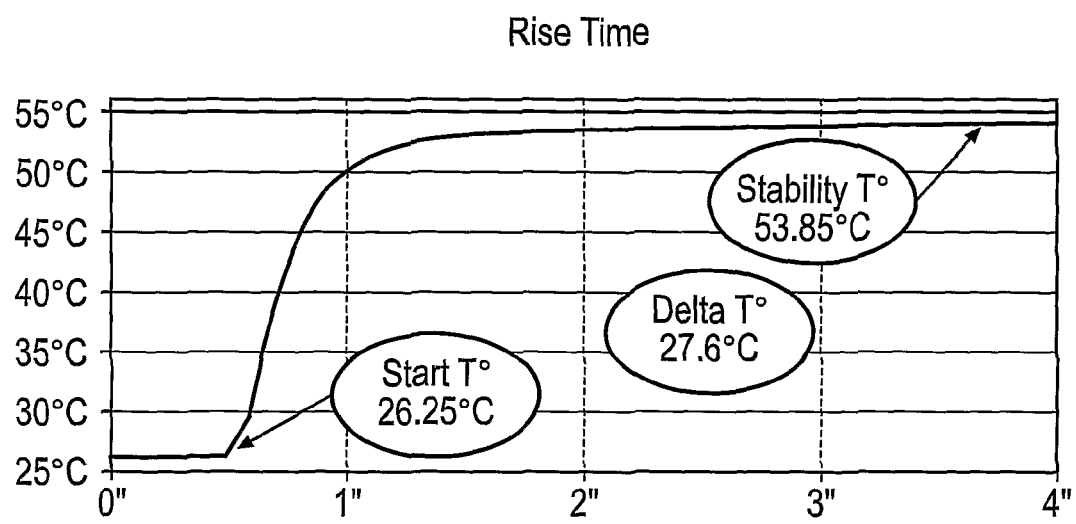
FIG. 9 is an expanded view of the data presented in FIG. 7 that shows the start and pseudo-stable temperatures.

FIG. 9 shows the first four seconds of data used in the graphs of FIGS. 7 and 8 plotted against an expanded temperature range. FIG. 9 thus shows both the start temperature of the sensor (26.25° C.) and the pseudo-stable temperature (53.85° C.) as determined in the manner described with reference to FIG. 8 above. In this example, the value of ΔT can be seen to be 27.6° C.

For a particular temperature sensor, a look-up table can be calculated that provides a correction value (C) for given values of ΔT. In particular, table 1 provides an appropriate correction value (C) for the temperature sensor of the present example when using the above defined pseudo-stability region.

TABLE 1

Look-up table for temperature correction.

| ΔT | Correction (C) |
|---|---|
| 10° C. | 0.50° C. |
| 20° C. | 0.80° C. |
| 30° C. | 1.00° C. |
| 40° C. | 1.20° C. |
| 50° C. | 1.35° C. |
| 60° C. | 1.50° C. |

The correction value (C) allows the actual temperature of an object to be found via the expression:

$$T_{est} = T_{pseudo\text{-}stab} + C \quad (1)$$

where $T_{est}$ is the predicted temperature of the object, $T_{pseudo\text{-}stab}$ is the determined pseudo-stable temperature and $C$ is the correction value appropriate for the calculated value of ΔT.

A look-up table could be produced in which correction values (C) are provided for multiple values of ΔT across the likely range. In such a case, the closest correction value could then simply be read from the look-up table and used in equation (1) to predict the actual temperature of the object. It is also possible to use a look-up table that includes fewer entries in combination with a suitable interpolation process to provide an interpolated correction value. For example, the data contained in table 1 may be used, to calculate a correction value for the above described ΔT value of 27.6° C. as follows:

$$C = \frac{[(27.6 - 20) \times 1.0 + (30 - 27.6) \times 0.8]}{10} = 0.95° \text{ C.} \quad (2)$$

Using the correction factor of equation (2) in equation (1) can thus be seen to provide a value of $T_{est}$ of 54.8° C. It can thus be seen that the above described prediction process can find the actual temperature of the object within four second of the temperature sensor contacting the surface. Furthermore, the temperature can be seen to be estimated to a high level of accuracy (i.e. it corresponds well to the actual temperature). The prediction process is thus much quicker than waiting for two minutes or so for thermal equilibrium between the sensor and part to be reached and also provides a reliable estimate of object temperature.

Look-up tables of the type provided as table 1 can be derived during an initial temperature sensor calibration process. This calibration process would typically involve collecting data (e.g. as shown in FIG. 7) until thermal equilibrium is reached for the required values of ΔT. The pseudo-stability temperature and actual (equilibrium) temperature can then be found from which the correction value (C) can be established. LUTs may be found for each individual sensor, or may be applicable to all temperature sensors of a particular design.

It should be noted that the definition of pseudo-stability may be varied according to the required measurement accuracy. For example, defining a wider stability delta (e.g. 2° C. per 2 seconds) decreases the measurement time but moves the pseudo-stable temperature further away from the actual temperature thereby reducing prediction accuracy. Conversely, defining a tighter stability delta (e.g. 0.2° C. per 2 seconds) increases the required measurement time but moves the pseudo-stable temperature closer to the actual temperature thereby increasing prediction accuracy. It can thus be seen that the method is flexible and allows a trade-off to be made between prediction accuracy and measurement time; a user can thus adapt the method as necessary for the particular application.

It should also be noted that the rise time characteristics will vary markedly with the thermal mass of the sensor. In particular, the rise time will be quicker for temperature sensors having a lower thermal mass. The use of low thermal mass sensors of the present invention is thus preferred as it enables a certain region of pseudo-stability to be reached in a shorter time, however the method could equally be applied to any type of temperature sensor.

The invention claimed is:

1. A temperature sensor comprising;
    a temperature sensing element; and
    a substantially thermally insulating substrate having a first side and a second side;
    wherein the first side of the substantially thermally insulating substrate carries a coating that comprises at least one layer of substantially thermally conductive material,
    wherein a first hole is provided on the second side of the substrate and the temperature sensing element is arranged to sense temperature within the first hole, and
    wherein the internal surfaces of the first hole are coated with thermally conductive material.

2. A temperature sensor according to claim 1 wherein the first hole extends from the second side through to the first side of the substrate.

3. A temperature sensor according to claim 1 wherein the temperature sensing element is welded into the first hole.

4. A temperature sensor according to claim 1 wherein the temperature sensing element is located, at least partially, within said first hole.

5. A temperature sensor according to claim 4 wherein the temperature sensing element comprises the hot junction of a thermocouple.

6. A temperature sensor according to claim 1 wherein said at least one layer of thermally conductive material that is located on the first side of the substrate comprises one or more layers of metal.

7. A temperature sensor according to claim 6 wherein said one or more layers of metal comprise at least one of a copper layer and a nickel layer.

8. A temperature sensor according to claim 1 wherein the substrate is substantially planar.

9. A temperature sensor according to claim 8 wherein the substantially planar substrate comprises at least one of fibreglass and ceramic.

10. Temperature measurement apparatus comprising a control box and a plurality of temperature sensors according to claim 1.

11. Apparatus according to claim 10 wherein each of said plurality of temperature sensors comprises the hot junction of a thermocouple and the control box comprises an electronics stage that comprises the cold junction of each of the thermocouples.

12. Apparatus according to claim 10 wherein the control box further comprising the first part of a wireless communications link, wherein the second part of the wireless communications link is provided on an associated interface thereby allowing wireless communications to be established between the control box and the associated interface.

13. A temperature sensing probe comprising a temperature sensor according to claim 1.

14. A probe according to claim 13 further comprising an associated interface, wherein
    the associated interface includes:
        a first part of a wireless communications link, and
        a second part of the wireless communications link, thereby allowing wireless communications to be established between the probe and the associated interface.

15. A probe according to claim 13 comprising a probe body and stylus protruding from said probe body, the stylus comprising a shaft carrying a sensor head that comprises said temperature sensor.

16. A probe according to claim 15 wherein the sensor head comprises a spring mechanism to allow movement of the sensor head relative to the shaft.

17. A probe according to claim 13 having a probe body comprising an electronics stage for processing signals generated by the temperature sensing element of the temperature sensor, wherein said electronics stage is substantially thermally isolated from the external environment.

18. A probe according to claim 17 wherein the temperature sensing element of the temperature sensor comprises the hot-junction of a thermocouple and the electronics stage comprises the cold junction of the said thermocouple, wherein, in use, the electronics stage is sufficiently thermally insulated from the external environment so that any variations in the temperature of the electronics stage occur with a slower time constant than the time constant of the cold junction.

19. A method of operating a temperature sensor of claim 1 to determine the temperature of an object, the method comprising the steps of; (i) bringing the temperature sensor into thermal contact with the object to be measured; (ii) using the temperature sensor to acquire a plurality of temperature readings, said plurality of temperature readings being acquired prior to the temperature sensor reaching thermal equilibrium with the object; and (iii) using at least some of the plurality of temperature readings of step (ii) to determine a pseudo-stable temperature at which the rate of change of temperature readings with time is less than a predetermined rate.

20. A temperature sensor comprising;
    a temperature sensing element; and
    a substantially thermally insulating substrate having a first side and a second side;
    wherein the first side of the substantially thermally insulating substrate carries a coating that comprises at least one layer of substantially thermally conductive material,
    wherein a first hole is provided on the second side of the substrate and the temperature sensing element is arranged to sense temperature within the first hole, and
    wherein a plurality of additional holes are provided on the second side of the substrate, the additional holes being located on the substrate in an arrangement that laterally surrounds the first hole.

21. A temperature sensor according to claim 20 wherein said additional holes form a thermal sensing region having a low thermal mass.

22. A temperature sensor according to claim 20 wherein a conductive material is provided on; (a) the internal surface of said first hole, (b) the internal surface of said additional holes and (c) a region on the second side of the substrate in the vicinity of said first and additional holes.

23. A temperature sensor comprising;
a temperature sensing element; and
a substantially thermally insulating substrate having a first side and a second side, wherein:
the first side of the substantially thermally insulating substrate carries a coating that comprises at least one layer of substantially thermally conductive material,
a first hole is provided on the second side of the substrate and the temperature sensing element is arranged to sense temperature within the first hole,
the first hole extends from the second side through to the first side of the substrate,
the temperature sensing element is located, at least partially, within said first hole, and
the internal surfaces of the first hole are coated with thermally conductive material.

24. A temperature sensor according to claim 23 wherein a plurality of additional holes are provided on the second side of the substrate, the additional holes being located on the substrate in an arrangement that laterally surrounds the first hole, and said additional holes form a thermal sensing region having a low thermal mass.

25. A temperature sensor according to claim 24 wherein a conductive material is provided on: (a) the internal surfaces of said first hole, (b) the internal surfaces of said additional holes and (c) a region on the second side of the substrate in the vicinity of said first and additional holes.

26. A method of manufacturing a temperature sensor comprising the steps, in any suitable order, of;
(i) taking a thermally insulating substrate having a first side and a second side;
(ii) coating at least one layer of substantially thermally conductive material on to the first side of the substrate;
(iii) forming a first hole on the second side of the substrate;
(iv) coating internal surfaces of the first hole with thermally conductive material; and
(v) placing at least part of a temperature sensing element within said first hole.

* * * * *